(12) United States Patent
Shukla et al.

(10) Patent No.: US 9,128,803 B2
(45) Date of Patent: Sep. 8, 2015

(54) APPLICATION MODEL FOR IMPLEMENTING COMPOSITE APPLICATIONS

(75) Inventors: Dharma Shukla, Sammamish, WA (US); Aditya Gopal Bhandarkar, Sammamish, WA (US); Akash Jeevan Sagar, Redmond, WA (US); Asad Jawahar, Woodinville, WA (US); Robert Brian Schmidt, Carlsbad, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 817 days.

(21) Appl. No.: 12/969,446

(22) Filed: Dec. 15, 2010

(65) Prior Publication Data

US 2012/0159425 A1 Jun. 21, 2012

(51) Int. Cl.
*G06F 9/44* (2006.01)

(52) U.S. Cl.
CPC .. *G06F 8/71* (2013.01); *G06F 8/35* (2013.01); *G06F 8/20* (2013.01); *G06F 8/36* (2013.01); *G06F 8/70* (2013.01)

(58) Field of Classification Search
CPC ...... G06F 8/10; G06F 8/20; G06F 8/34–8/36; G06F 8/38; G06F 8/60; G06F 9/4428; G06F 8/70
USPC ........................................................ 717/104
See application file for complete search history.

(56) References Cited

U.S. PATENT DOCUMENTS

| 7,356,679 | B1 | 4/2008 | Le et al. | |
|---|---|---|---|---|
| 8,161,479 | B2 | 4/2012 | Sedukhin et al. | |
| 2004/0010788 | A1 | 1/2004 | Cota-Robles et al. | |
| 2005/0005018 | A1 | 1/2005 | Datta | |
| 2005/0091227 | A1* | 4/2005 | McCollum et al. | 707/100 |
| 2006/0026592 | A1 | 2/2006 | Simonen et al. | |
| 2006/0070066 | A1 | 3/2006 | Grobman | |

(Continued)

FOREIGN PATENT DOCUMENTS

| GB | 2423168 A | 8/2006 |
|---|---|---|
| JP | 2005208999 | 8/2005 |

OTHER PUBLICATIONS

Patterns for High Availability, Scalability, and Computing Power with Windows Azure, May 2009, (9 pages).

(Continued)

*Primary Examiner* — John Breene
*Assistant Examiner* — Lynda Dinh
(74) *Attorney, Agent, or Firm* — Brian Haslam; Aaron Hoff; Micky Minhas

(57) ABSTRACT

Embodiments are directed to providing an application model for implementing composite applications and to providing a declarative programming model and distributed runtime for creating and executing composite applications. In an embodiment, a computer system instantiates an application model. The application model allows users to compose composite applications. The composite applications are configured to run on both distributed computing systems and local computing systems. The computer system receives user input at the instantiated application model. The user input indicates which composite application components are to be used in conjunction with each other to form the composite application. The computer system also provides the composite application on a distributed computing system and/or a local computing system.

20 Claims, 4 Drawing Sheets

(56) References Cited

U.S. PATENT DOCUMENTS

| | | | |
|---|---|---|---|
| 2006/0106882 A1* | 5/2006 | Douceur et al. | 707/200 |
| 2006/0123416 A1 | 6/2006 | Bertolotti | |
| 2006/0184937 A1 | 8/2006 | Abels et al. | |
| 2007/0016615 A1* | 1/2007 | Mohan et al. | 707/104.1 |
| 2007/0028244 A1 | 2/2007 | Landis et al. | |
| 2007/0038998 A1 | 2/2007 | Fries | |
| 2007/0078988 A1 | 4/2007 | Miloushev et al. | |
| 2007/0168956 A1 | 7/2007 | Moore et al. | |
| 2007/0174429 A1 | 7/2007 | Mazzaferri et al. | |
| 2007/0234282 A1* | 10/2007 | Prigge et al. | 717/107 |
| 2007/0239944 A1 | 10/2007 | Rupanagunta et al. | |
| 2007/0250833 A1 | 10/2007 | Araujo et al. | |
| 2007/0300069 A1 | 12/2007 | Rozas | |
| 2008/0034365 A1 | 2/2008 | Dahlstedt | |
| 2008/0134178 A1 | 6/2008 | Fitzgerald | |
| 2008/0250071 A1* | 10/2008 | Norring et al. | 707/104.1 |
| 2009/0037835 A1 | 2/2009 | Goldman | |
| 2009/0249296 A1* | 10/2009 | Haenel et al. | 717/120 |
| 2009/0276771 A1 | 11/2009 | Nickolov et al. | |
| 2009/0300423 A1 | 12/2009 | Ferris | |
| 2009/0313620 A1 | 12/2009 | Sedukhin et al. | |
| 2011/0082924 A1* | 4/2011 | Gopalakrishnan | 709/223 |

OTHER PUBLICATIONS

Jouni Maenpaa, Cloud computing with the Azure platform, Apr. 27, 2009, (5 pages).

Introducing the Azure Services Platform, Oct. 2008, (3 pages).

Software as a Service (SaaS): An Enterprise Perspective, Oct. 2006, (13 pages).

Aaron Skonnard, Building Distributed Applications With .NET Services, Apr. 2009, (10 pages).

Krsul I et al., "VMPlants: Providing and managing Virtual Machine Execution Environments for Grid Computing", Supercomputing, 2004. Proceedings of the ACM/IEEE SC2004 Conference Pittsburgh, PA, Nov. 6-12, 2004, Piscataway, NJ, 1 page.

Author Unknown, "Virtualization, SaaS & SOA: Introducing Service Oriented Programming", Feb. 24, 2008, 2 pgs. Retrieved from <<http://www.semantic-web.at/index.php?id=1&subid=57&action=resources&item=1705>>.

Demarest et al., "Oracle Fusion Architecture and Oracle Fusion Applications", An Oracle Technical White Paper, Oracle Corporation, Redwood Shores, California, Jan. 2006, 44 pgs. Available at <<http://www.oracle.com/industries/financial_services/fusion-architecture-wp.pdf>>.

Abels, "Microsoft Operations Manger (MOM) 2005: Integrated for the Dell Scalable Enterprise", Dell Scalable Enterprise Technology Center, MOM 2005 Overview: Managing Windows and Virtualization, Chapter 2, Sep. 2006, 31 pages. Available at <<http://www.dell.com/downloads/global/power/mom_2005_dellse_abels_ch2.pdf>>.

Sigal, "Data Center Automation and the Agile Enterprise, The Emergence of Application-Ready, Modular Utility Computing Platforms", Available at least as early as Apr. 15, 2008, Available at <<http://www.afcom.com/afcomnew/popupfiles/agile_enterprise.html>>.

U.S. Appl. No. 12/138,591, Aug. 15, 2011, Office Action.

U.S. Appl. No. 12/138,591, Dec. 27, 2011, Notice of Allowance.

* cited by examiner

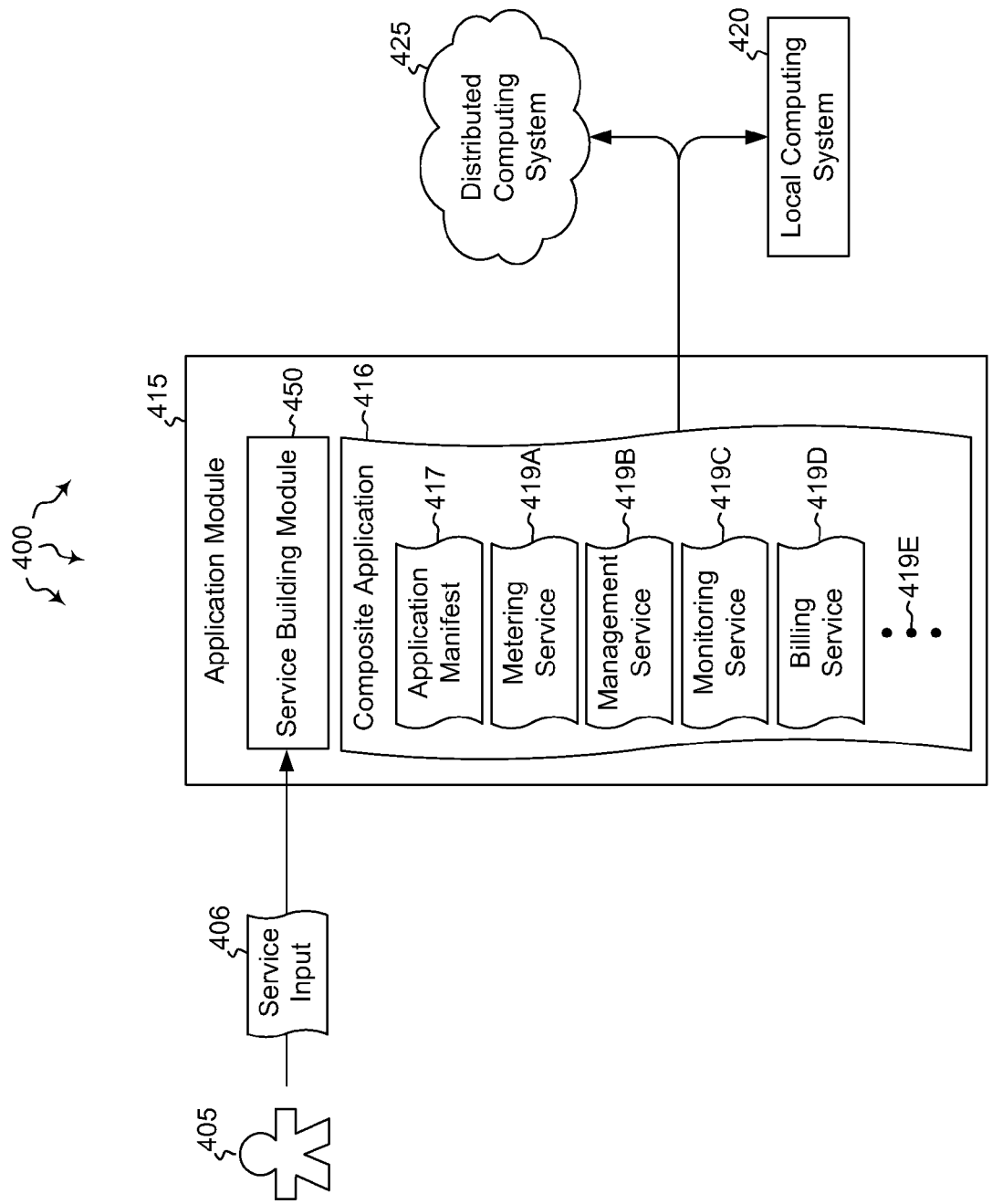

APPLICATION MODEL FOR IMPLEMENTING COMPOSITE APPLICATIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Software applications are typically designed for use in a certain environment. For instance, some applications are designed to run on a local computer system, such as an end-user's computer system. Other applications are designed to be run on distributed computer systems. In such cases, a user's local machine accesses a user interface of the distributed application, while the application itself is run on an external set of computer systems. These applications are designed to run either locally on a local computer system or on a distributed computer system, but not both.

BRIEF SUMMARY

Embodiments described herein are directed to providing an application model for implementing composite applications and to providing a declarative programming model and distributed runtime for creating and executing composite applications. In one embodiment, a computer system instantiates an application model. The application model allows users to compose composite applications. The composite applications are configured to run on both distributed computing systems and local computing systems. The computer system receives user input at the instantiated application model. The user input indicates which composite application components are to be used in conjunction with each other to form the composite application. The computer system also provides the composite application on a distributed computing system and/or a local computing system.

In another embodiment, a computer system instantiates a declarative application model. The declarative application model allows users to create composite applications. The composite applications are configured to run on both distributed computing systems and local computing systems. The computer system receives user input at the declarative application model. The user input indicates which scalable composite application components are to be used in conjunction with each other to form the composite application. The computer system partitions application component code and component state information into multiple user-accessible partitions. The computer system also replicates the application's state into replica stores, so that application state information is available from each of the replica stores, and provides a distributed runtime for the declarative application model for executing the composite applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates an alternative embodiment for providing an application model for implementing composite applications.

DETAILED DESCRIPTION

Figure 1:
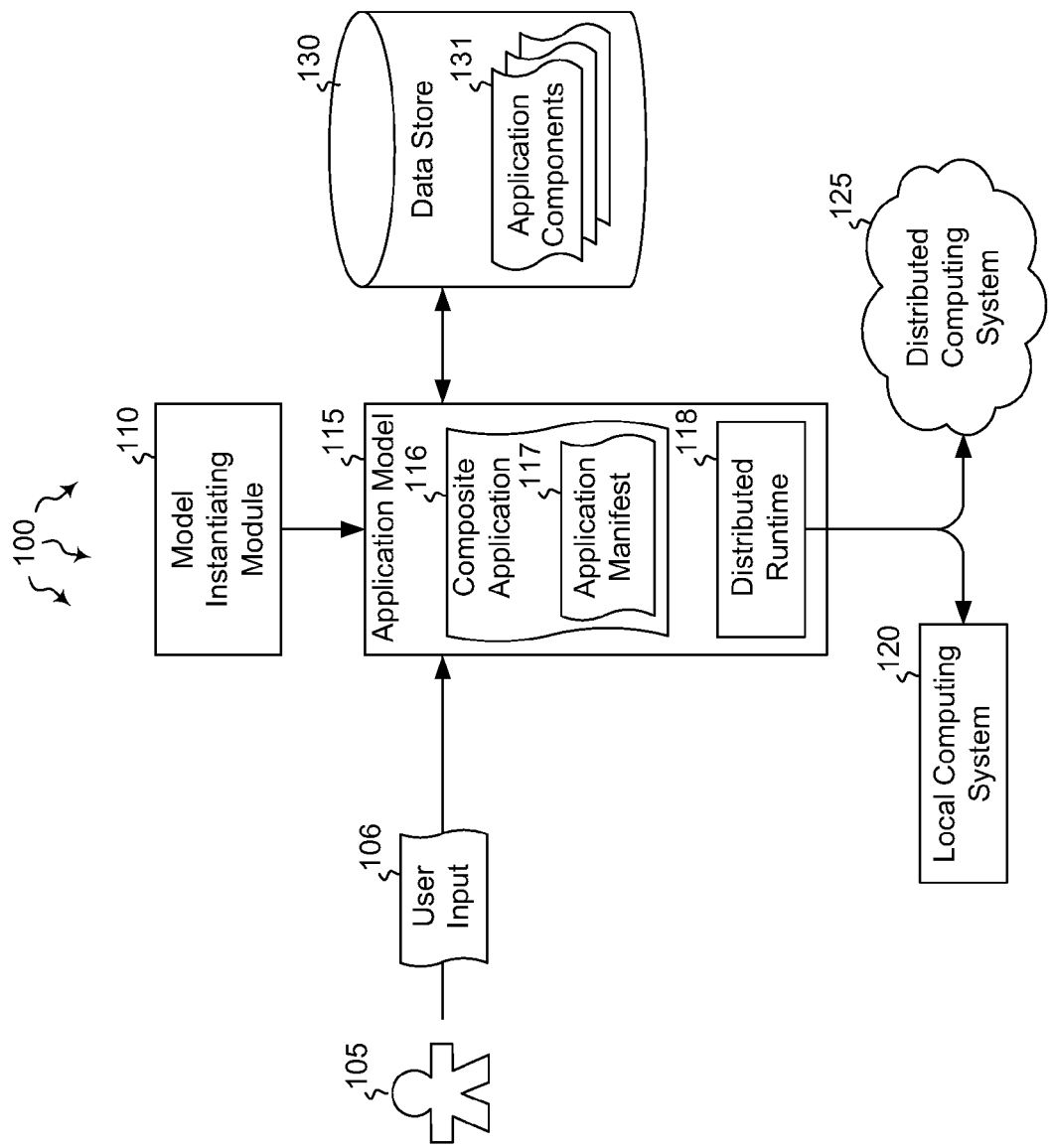
FIG. 1 illustrates a computer architecture in which embodiments of the present invention may operate including providing an application model for implementing composite applications.

Embodiments described herein are directed to providing an application model for implementing composite applications and to providing a declarative programming model and distributed runtime for creating and executing composite applications. In one embodiment, a computer system instantiates an application model. The application model allows users to compose composite applications. The composite applications are configured to run on both distributed computing systems and local computing systems. The computer system receives user input at the instantiated application model. The user input indicates which composite application components are to be used in conjunction with each other to form the composite application. The computer system also provides the composite application on a distributed computing system and/or a local computing system.

In another embodiment, a computer system instantiates a declarative application model. The declarative application model allows users to create composite applications. The composite applications are configured to run on both distributed computing systems and local computing systems. The computer system receives user input at the declarative application model. The user input indicates which scalable composite application components are to be used in conjunction with each other to form the composite application. The computer system partitions application component code and component state information into multiple user-accessible partitions. The computer system also replicates the application's state into replica stores, so that application state information is available from each of the replica stores, and provides a distributed runtime for the declarative application model for executing the composite applications.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes application model 115. The application model may be instantiated on one or more different computer systems by model instantiating module 110. The application model may provide many different options to various users. In some cases, the application model provides software and/or hardware functionality that allows a software application or service to be run on both a local computer system 120 and a distributed computer system 125. The local or on-premises computing system may include a single computer system or a local network of systems. The distributed computing system may include a plurality of different computer systems, processors (or other hardware), service providers or other distributed systems configured to process inputs. In some cases, the distributed computing system 125 may comprise what is commonly referred to in the art as the cloud.

The application model 115 may be configured to access data store 130. The data store may be any type of local or distributed storage and may include anything from local hard drives and optical or flash media to storage area networks or cloud data stores. Data store 130 may include various application components 131. These application components may include various software functions, services, features, applets or entire applications. These application components may be used in the application model to form a composite application. The application model may allow a user (e.g. 105) to select various application components that are to be used together to form a larger or multi-purpose application. Such composite applications (e.g. 116) may be created using the application model, and may be used in both local, on-premises computing systems and on distributed computing systems.

The composite application includes an application manifest 117. The application manifest includes information about the various application components, as well as relationship information describing the relationships between the different components that make up the composite application. The application model also includes a distributed runtime 118. The distributed runtime is configured to execute or allows execution of the composite application on multiple different environments, including both local and distributed environments.

In some embodiments, the application model 115 may comprise a component abstraction that is technology agnostic and environment neutral (e.g. cloud 125 or local 120). The application model may be used for encapsulating highly available and scalable logic via stateful, partitioned implementations, as well as stateless, scale out implementations. The application model is extensible and it allows development of components (both stateless and stateful) using (at least in some cases) existing development technologies. The model also allows custom development paradigms suited to specific domains.

The application model 115 may provide one or more of the following in various embodiments: 1) a formal notion of component execution and deployment of state machines, state replication, controlling and managing the state consistency in the face of partitioning and availability requirements, 2) a formal model to describe cross cutting concerns such as metering, throttling or rate limiting, billing, logging and other services, 3) a formal way to describe component dependencies (exports and imports) and other component relationships, 4) a formal way to participate in distributed composition at runtime, and 5) a formal notion of multiple levels of application tenants.

As used herein, a component in the application model may refer to a unit of software functionality encapsulation, extensibility and composition. A component may encapsulate a given feature, service or software platform. Multiple components may encapsulate the same technology and offer alternate or competing component representations. A component may be stateless (no state or externalized state) or stateful (i.e. the component maintains state locally). Stateful components may be replicated for high availability and partitioned for scalability.

Components may be logically grouped in clusters or other groupings. A cluster may be a unit of hosting providing activation, scalability, availability and/or isolation. Components in a cluster may be co-located in the same execution environment and may leverage this co-location for data affinity. In some cases, the application model may include a set of clusters, each of which contains a set of components. Composite applications may be deployed to the execution environment on-premise or on the cloud.

The application model may be configured to abstract component developers from various specifics of the hosting environment. Component-hosting environment interactions may be brokered through provider interfaces. A component developer may write a component's code against these provider interfaces. At runtime, the distributed component runtime 118 may resolve an environment specific implementation.

The distributed component runtime 118 may be hosted by substantially any hosting environment: on-premises hosts such as a server platform (both server and client applications) and in the cloud. In some cases, the hosting environment can use the application abstraction to load an application definition and boostrap the distributed component runtime (DCR). The DCR may include a plurality of host services that are proffered by the hosting environment. These host services may include any one or more of the following: 1) an address resolution service to resolve addresses of components at runtime, 2) an address registration service to claim listed addresses, 3) a metering and throttling service for monitoring and throttling components, 4) a billing service for billing tenants of the application, 5) a logging service for creating application logs, and 6) a storage service for applications and components to store state.

In some cases, because the components 131 are written against an abstract provider, the same components can be used in any environment (local or distributed). The component definition (e.g. manifest 117) also captures the scale out and high availability requirements of the components. The application developer may also be shielded from any cloud/local differences. The application developer may compose an application using a component definition and by configuring the individual components. The developer may retain flexibility about whether a component (or the entire composite application) runs on premise and/or in the cloud. Thus, in some cases, as infrastructure changes over time, the application architecture can naturally evolve and change as needed. These and other concepts will be explained in greater detail below with regard to methods 200 and 300 of FIGS. 2 and 3, respectively.

Figure 2:
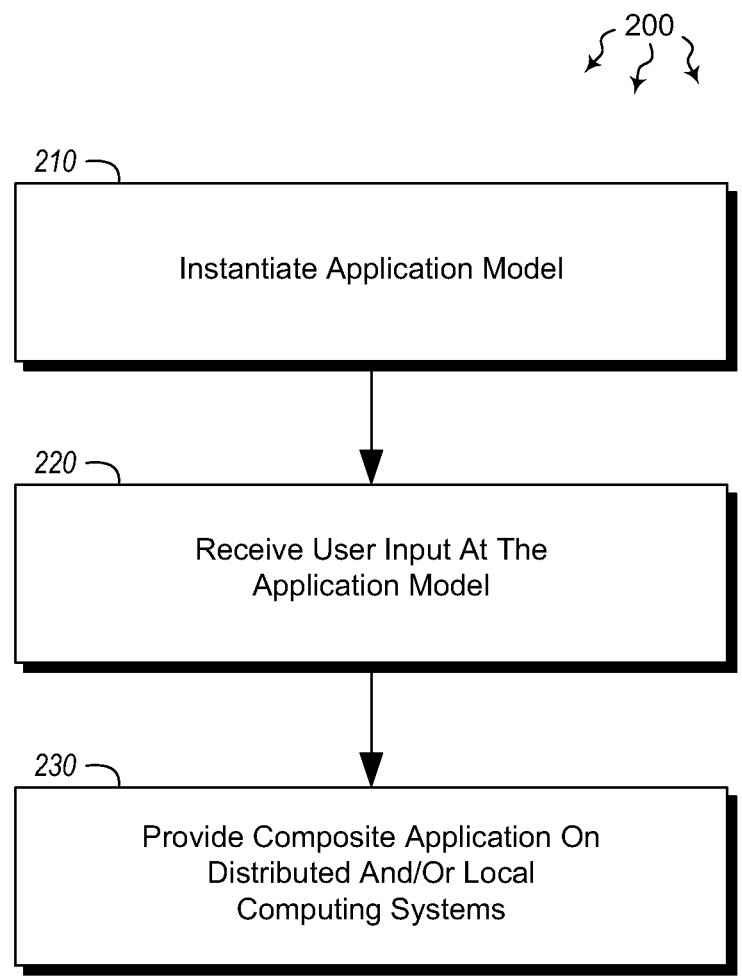
FIG. 2 illustrates a flowchart of an example method for providing an application model for implementing composite applications.
Figure 3:
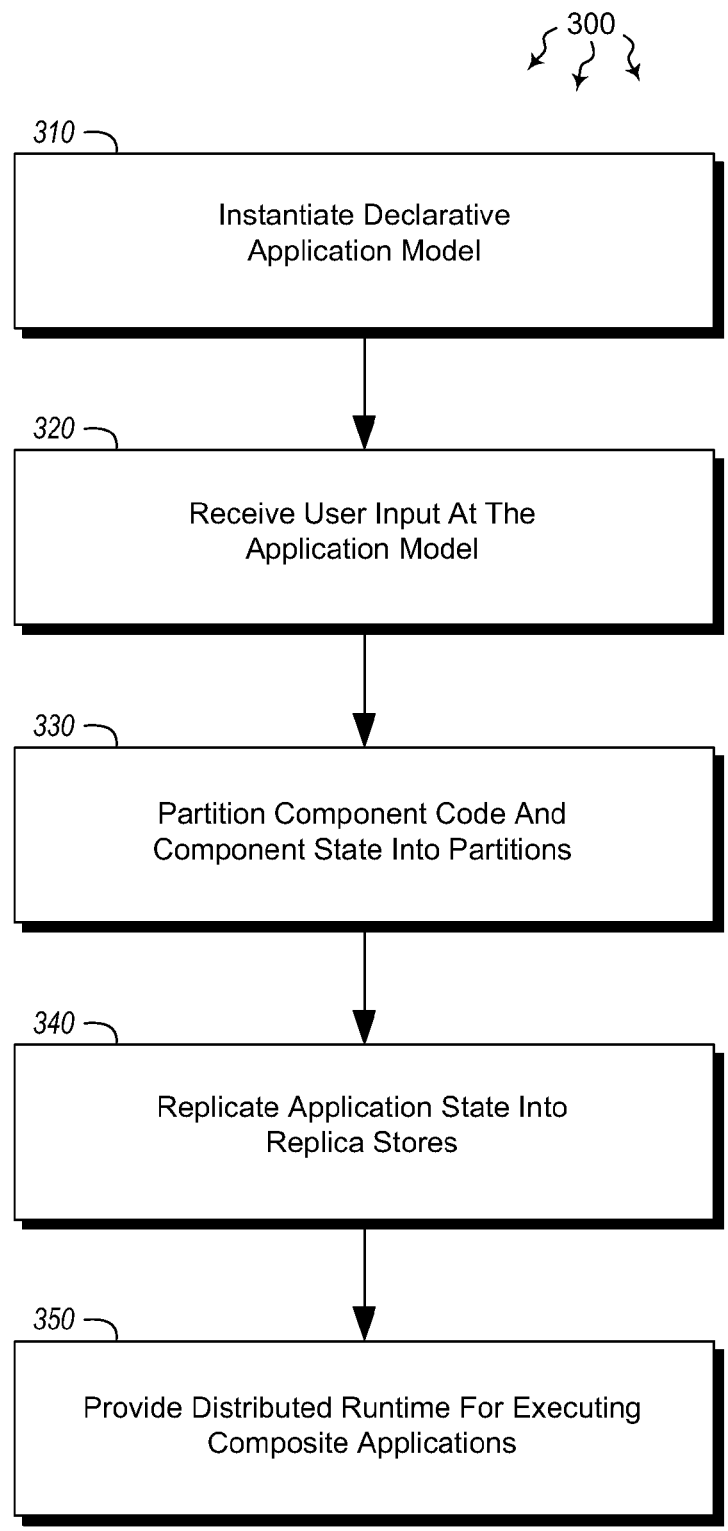
FIG. 3 illustrates a flowchart of an example method for providing a declarative programming model and distributed runtime for creating and executing composite applications.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing an application model for implementing composite applications. The method 200 will now be described with frequent reference to the components and data of environment 100.

Method 200 includes an act of instantiating an application model, wherein the application model allows users to compose composite applications, wherein composite applications are configured to run on both distributed computing systems and local computing systems (act 210). For example, model instantiating module 110 may instantiate application model 115. The application model may allow user 105 to compose composite application 116 which is configured to run on both distributed computing system 125 and local computing system 120. In some cases, the application model itself may be hosted on the local computing system or the distributed computing system.

As mentioned above, composite applications may be made up of multiple different application components 131. These components may be linked together using an application manifest 117 which describes various relationships between the components of the composite application 116. The relationships may include various component or hardware dependencies, methods of calling, using or sending and receiving inputs to/from the components (imports and exports). In some cases, a composite application may be pieced together one component (or component cluster) at a time. As components are added or removed from a composite application, the application manifest may be dynamically updated to include the component changes.

In some embodiments, the application model may allow user-selectable and user-definable services to be built on the composite application. Thus, services including, but not limited to the following, may be added to a composite application: application management services, application health monitoring services, metering, throttling, runtime address resolution services (to resolve component addresses), address registration, billing, logging, storage and other services. It will be understood by one skilled in the art that the above-listed services are merely examples of services that can be built for use with a composite application, and that substantially any type of service may be provided in this manner.

The application model may allow users to submit application components to a component pool which is accessible by other users in creating other composite applications. Thus, users may access the component pool (e.g. in data store 130) and select which components are to be added to the user's composite application. Each component may include metadata describing the component, how to implement the component, inputs and outputs, etc. Such metadata may be included as part of the application manifest 117.

Composite application components may be stateful, meaning that the component's state information is stored with the composite application. Alternatively, composite application components may be stateless, meaning that the component's state information is stored external to the composite application. Each component's state may be used by the composite application in which the component has been implemented. In some cases, data store 130 may store both stateful and stateless versions of an application component. Accordingly, in any given composite application, stateful and/or stateless components may be implemented.

Returning to FIG. 2, method 200 includes an act of receiving user input at the instantiated application model, wherein the user input indicates that one or more composite application components are to be used in conjunction with each other to form the composite application (act 220). For example, application model 115 may receive user input 106 from user 105 where the user input identifies which application components 131 are to be used to form composite application 116. The user may opt to implement substantially any number of application components in a given application. As the user adds and removes application components, the application's manifest 117 is dynamically updated.

Method 200 also includes an act of providing the composite application on at least one of a distributed computing system and a local computing system (act 230). For example, application model 115 may provide the composite application on either or both of local computing system 120 and distributed computing system 125. Because the application is composed of components designed to work in either local or distributed environments, the entire application, once created, can itself be run on either local or distributed computing systems.

The application model may also include a distributed runtime 118 for executing the composite application 116. The distributed runtime allows the composite application to be run locally or on a distributed system. Using the distributed runtime, users may partition state information among a plurality of data stores (e.g. 130). Partitioning the state information may facilitate scaling the application to a greater number of users.

In some cases, the application model 115 may allow users to run the constructed composite application in the application model itself. Moreover, the application model may be configured to manage the end-to-end lifecycle of the composite application. Thus, the model allows for the creation, implementation, execution and deployment of composite applications. In this manner, users may use a single application model to create and manage a composite application that can run on both local and distributed computing systems, without modifying the components or software code of the application.

FIG. 3 illustrates a flowchart of a method 300 for providing a declarative programming model for creating composite applications. The method 300 will now be described with frequent reference to the components and data of environments 100 and 400 of FIGS. 1 and 4, respectively.

Method 300 includes an act of instantiating a declarative application model, wherein the declarative application model allows users to create composite applications, wherein the composite applications are configured to run on both distributed computing systems and local computing systems (act 310). For example, application model 415 may be instantiated on a local or distributed computing system. The declarative application model may allow user 405 to create composite application 416. Composite application 416 may be created in declarative application model 415 and may be deployed to both local computing systems 420 and distributed computing systems 425.

The declarative application model may provide a means to formally describe services. Service building module 450 may receive service inputs 406 from different users (e.g. 405) which define or select services which are to be implemented on top of (i.e. in addition to) the application's components. The services may include all types of services including, but not limited to, metering services 419A, application management services 419B, application monitoring services 419C, billing services 419D and other services 419E. Each component may be able to implement one or more services, and the composite application as a whole may be able to implement one or more services. Thus, developers have a high level of control over which components implement which services and which services are used with which applications.

The application model may also provide a means to formally describe component dependencies and other component relationships. Developers may describe which components can be used with other components, how the components are to communicate (including sending and receiving data), and how services are to be implemented with each component.

Method 300 includes an act of receiving user input at the declarative application model, wherein the user input indicates that one or more scalable composite application components are to be used in conjunction with each other to form the composite application (act 320). For example, declarative application model 415 may receive user input 406. The user input may indicate that various application components are to be used together to form composite application 416. The user input may be received from a user that is a user of a particular client or tenant. Each tenant may have a plurality of users, and the declarative application model may be provided to multiple levels of application tenants.

Method 300 includes an act of partitioning application component code and component state information into a plurality of user-accessible partitions (act 330). For example, application components 131 stored in data store 130 of FIG. 1 and component state may be partitioned into multiple different user-accessible partitions. Each of the partitions may be stored on a single data store, or may be spread over multiple different data stores. As such, the application component code and component state information may be scalable to large (and customizable) number of distributed computing systems. In some cases, the distributed computing systems may be geographically dispersed, so as to reduce access time by users in various geographic regions.

Method 300 includes an act of replicating the application's state into one or more replica stores, such that application state information is available from each of the replica stores (act 340). For example, application state for application 416 may be replicated into multiple different data stores. Thus, as mentioned above, the state may be stored on a made available by geographically diverse data stores. In some cases, the partitioning and replicating may occur in the cloud. In such cases, the application, application state and other application information may be available to substantially anyone anywhere with an internet connection.

Method 300 also includes an act of providing a distributed runtime for the declarative application model for executing the composite application (act 350). For example, distributed runtime 118 may be provided by declarative application model 415. The distributed runtime may be configured to execute the composite application. Additionally or alternatively, the distributed runtime may be configured to prepare the composite application for execution on the local (420) and/or distributed (425) computing systems.

Accordingly, methods, systems and computer program products may be provided which provide an application model that allows creation and execution of composite applications. Moreover, methods, systems and computer program products may be provided which provide a declarative programming model for creating composite applications which may be run on both local and distributed computing systems, without altering the application's code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for providing an application model for implementing composite applications in a computer networking environment including a plurality of computing systems, the method comprising:
    instantiating, by a computer system, the application model, wherein the application model allows users to compose composite applications, wherein the composite applications are configured to run on both distributed computing systems and local computing systems, the application model further allows the users to:
        specify a plurality of services that are available for each composite application component, wherein the composite application component is run locally or distributed, and wherein the composite application has both a subset of locally run application components and a subset of distributed application components, the application model being configured to manage state replication and state consistency among application components, and
        use the application model to implement both stateful components and stateless components in the same composite application, wherein the application model further allows composite application configurations for multiple levels of application tenants;
    receiving, by the computer system, user input at the instantiated application model, wherein the user input indicates that one or more composite application components are used in conjunction with each other to form the composite application, and specifies which one or more of the plurality of services are to be used with each composite application component, wherein at least one of the composite application components is run locally or distributed; and
    providing, by the computer system, the composite application on at least one of a distributed computing system and a local computing system.

2. The method of claim 1, wherein the composite application components are linked together using an application manifest which describes various relationships between the components of the composite application.

3. The method of claim 2, wherein the application manifest is dynamically updated as components are added and removed from the composite application.

4. The method of claim 1, wherein the application model allows user-selectable and user-definable services to be built on the composite application.

5. The method of claim 4, wherein the services comprise at least one of application management, application health monitoring, metering, throttling, runtime address resolution to resolve component addresses, address registration, billing, logging and storage services.

6. The method of claim 1, wherein the application model allows users to submit components to a component pool which is accessible by other users in creating other composite applications.

7. The method of claim 1, wherein the composite application components are stateful, such that the component's state information is stored with the composite application.

8. The method of claim 1, wherein the composite application components are stateless, such that the component's state information is stored external to the composite application.

9. The method of claim 1, wherein the application model includes a distributed runtime for executing the composite applications.

10. The method of claim 9, wherein the distributed runtime allows users to partition state information among a plurality of data stores.

11. The method of claim 1, wherein the application model is configured to manage the end-to-end lifecycle of the composite application.

12. The method of claim 1, wherein application model allows the user to run the composite application in the application model itself.

13. The method of claim 1, wherein the application model is hosted on at least one of the local computing system and the distributed computing system.

14. A computer program product for providing a declarative programming model for creating composite applications, the computer program product comprising at least one computer-readable storage device having stored thereon computer-executable instructions that, when executed by one or more processors of a computer system, cause the computer system to:
    instantiate a declarative application model, wherein the declarative application model allows users to compose composite applications, wherein the composite applications are configured to run on both distributed computing systems and local computing systems, the declarative application model further allows the users to:
        specify a plurality of services that are available for each composite application component, wherein the composite application component is run locally or distributed, and wherein the composite application has both a subset of locally run application components and a subset of distributed application components, the application model being configured to manage state replication and state consistency among application components, and
        use the application model to implement both stateful components and stateless components in the same composite application, wherein the declarative application model further allows composite application configuration for multiple levels of application tenants;

receive user input at the declarative application model, wherein the user input indicates that one or more scalable composite application components are used in conjunction with each other to form the composite application, and specify which one or more of the plurality of services are to be used with each composite application component wherein at least one of the composite application components is run locally or distributed;

partition application component code and component state information into a plurality of partitions; and replicate the application state into one or more replica stores, such that application state information is available from each of the replica stores.

15. The computer program product of claim 14, wherein the application model includes a distributed runtime for executing the composite applications.

16. The computer program product of claim 14, wherein the partitioning of the application component code and component state information is scalable to a customizable number of distributed computing systems.

17. The computer program product of claim 14, wherein the declarative application model provides a means to formally describe services.

18. The computer program product of claim 14, wherein the declarative application model provides a means to formally describe component dependencies.

19. The computer program product of claim 14, wherein the declarative application model is provided to multiple levels of application tenants.

20. A computer system for providing a declarative programming model and distributed runtime for creating and executing composite applications, the computer system comprising: one or more processors; system memory; a user interface; one or more computer-readable storage media having stored thereon computer-executable instructions that, when executed by the one or more processors, causes the computer system to:

instantiate a declarative application model, wherein the declarative application model allows users to create composite applications, wherein the composite applications are configured to run on both distributed computing systems and local computing systems, the declarative application model further allows the users to:

specify a plurality of services that are available for each composite application component, wherein the composite application component is run locally or distributed, and wherein the composite application has both a subset of locally run application components and a subset of distributed application components, manage state replication and state consistency among application components, and compose the composite applications using the application model to implement both stateful components and stateless components in the same composite application, wherein the declarative application model further allows composite application configuration for multiple levels of application tenants;

receive user input at the declarative application model, wherein the user input indicates that one or more scalable composite application components are to be used in conjunction with each other to form the composite application, the user input specifying which one or more of the plurality of services are to be used with each composite application component, wherein at least one of the composite application components, is run locally or distributed;

partition application component code and component state information into a plurality of user-accessible partitions;

replicate the application state into one or more replica stores, such that application state information is available from each of the replica stores; and provide a distributed runtime for the declarative application model for executing the composite application.

* * * * *